(12) United States Patent
Dharmaraju et al.

(10) Patent No.: US 12,261,695 B1
(45) Date of Patent: Mar. 25, 2025

(54) CONFIGURING ARBITRARY JUMPS IN A LINEAR FEEDBACK SHIFT REGISTER IN WIRELESS COMMUNICATIONS

(71) Applicant: QUALCOMM Incorporated, San Diego, CA (US)

(72) Inventors: Dinesh Dharmaraju, San Diego, CA (US); Anthony Fanous, San Diego, CA (US); David Hoyle, Tideswell (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/470,172

(22) Filed: Sep. 19, 2023

(51) Int. Cl.
*G06F 11/00* (2006.01)
*G06F 7/58* (2006.01)
*H04L 1/00* (2006.01)

(52) U.S. Cl.
CPC .......... *H04L 1/0073* (2013.01); *G06F 7/584* (2013.01); *H04L 1/0016* (2013.01)

(58) Field of Classification Search
None
See application file for complete search history.

(56) References Cited

U.S. PATENT DOCUMENTS

| | | | |
|---|---|---|---|
| 2002/0031169 A1* | 3/2002 | Lipponen ............... | H04J 13/10 370/342 |
| 2002/0156823 A1* | 10/2002 | Weng ..................... | G06F 7/726 708/492 |
| 2004/0130466 A1* | 7/2004 | Lu .......................... | H04J 13/10 708/252 |
| 2004/0205095 A1* | 10/2004 | Gressel ................... | H03K 3/84 708/253 |
| 2006/0109888 A1 | 5/2006 | Medlock | |
| 2008/0144819 A1* | 6/2008 | Gehrmann ............ | H04L 9/0643 380/46 |
| 2010/0054391 A1 | 3/2010 | Thackray | |
| 2018/0074791 A1* | 3/2018 | Atsumi ................... | G06F 7/584 |

OTHER PUBLICATIONS

International Search Report and Written Opinion—PCT/US2024/038758—ISA/EPO—Nov. 6, 2024.
Sriram S., et al., "Efficient Pseudo-Noise Sequence Generation for Spread-Spectrum Applications", Signal Processing Systems, 2002. (SIPS '02). IEEE Workshop on Oct. 16-18, 2002, Piscataway, NJ, USA, IEEE, Oct. 16, 2002, XP010616581, pp. 80-86, abstract, figures 1-6, Sections 2-5, 9.

* cited by examiner

*Primary Examiner* — Mujtaba M Chaudry
(74) *Attorney, Agent, or Firm* — ArentFox Schiff LLP

(57) ABSTRACT

Aspects described herein relate to selecting a base representation for an advance offset of a shift register sequence, generating the shift register sequence corresponding to the advance offset based at least in part on the base representation, and processing a signal based at least in part on the shift register sequence.

20 Claims, 7 Drawing Sheets

CONFIGURING ARBITRARY JUMPS IN A LINEAR FEEDBACK SHIFT REGISTER IN WIRELESS COMMUNICATIONS

FIELD OF THE DISCLOSURE

Aspects of the present disclosure relate generally to wireless communication systems, and more particularly, to processing signals using a linear feedback shift register.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include; enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to select a base representation for an advance offset of a shift register sequence, generate the shift register sequence corresponding to the advance offset based at least in part on the base representation, and process a signal based at least in part on the shift register sequence.

In another aspect, a method for wireless communication by a device is provided that includes selecting a base representation for an advance offset of a shift register sequence, generating the shift register sequence corresponding to the advance offset based at least in part on the base representation, and processing a signal based at least in part on the shift register sequence.

In another aspect, one or more computer-readable media including code executable by one or more processors for wireless communication by a device are provided. The code includes code for selecting a base representation for an advance offset of a shift register sequence, generating the shift register sequence corresponding to the advance offset based at least in part on the base representation, and processing a signal based at least in part on the shift register sequence.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, one or more computer-readable media are provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
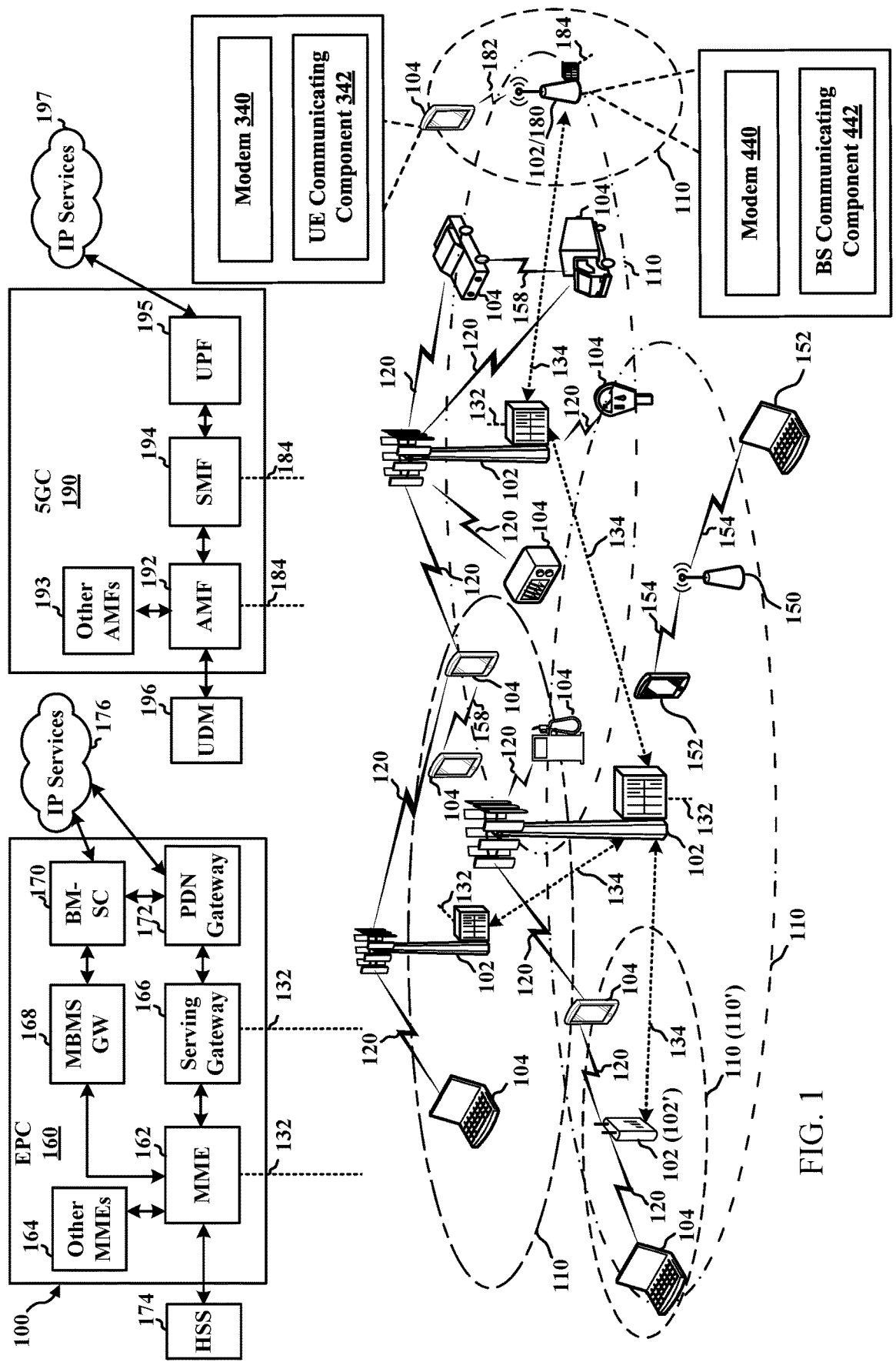
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring or accomplishing arbitrary jumps in a linear feedback shift register and/or applying the linear feedback shift register in a cellular modem for processing signals. Devices in modern wireless communication systems, such as fourth generation (4G) long term evolution (LTE), fifth generation (5G) new radio (NR), sixth generation (6G), and beyond, use scrambling sequences (also referred to as Gold sequences) obtained from linear feedback shift registers (LFSRs) for processing signals, such as for scrambling signals from transmission, descrambling received signals, etc. For example, the devices can initialize the scrambling sequences using certain, time, user, or channel specific parameters. Efficient usage of hardware and low latency performance can be based on arbitrary jumps in the LFSR states.

In an example, LFSRs described in Fibonacci notation can constitute pseudo-random sequence generation in some wireless communication technologies. For example, in third generation partnership project (3GPP) technical specification (TS) 36.211, section 7.2, pseudo-random sequences are defined by a length-31 Gold sequence. The output sequence $c(n)$ of length $M_{PN}$, where $n=0, 1, \ldots, M_{PN}-1$, is defined by:

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_c=1600$ and the first m-sequence can be initialized with $x_1(0)=1, x_1(n)=0, n=1, 2, \ldots, 30$. The initialization of the second m-sequence can be denoted by $$c_{init} = \sum_{i=0}^{30} x_2(i) \cdot 2^i$$

with the value depending on the application of the sequence. For a modem using the sequences for processing signals, the LFSRs $x_1$ and $x_2$ can be based on primitive polynomials in Galois Field (e.g., $GF(2^{31})$).

LFSRs in Fibonacci representation for forwarding in arbitrary jump (N) can use sequential linear shifting, which can use many clock cycles or Microprocessor without Interlocked Pipelined Stages (MIPS). Fibonacci LFSRs cannot be advanced by arbitrary amounts without the use of matrices raised to the power of the advance amount. However it can be shown that a Fibonacci LFSR is equivalent to a Galois LFSR, in that it can generate the same sequence, but with a specific time offset. In addition, a Galois State machine can be implemented by a Galois Field multiplication by a value an, where a is the root of the field. Galois Field multiplication is a general purpose operation And can be implemented, in a general way, using a polynomial (carryless) multiplier. An arbitrary jump of N in Galois domain can be obtained with lesser MIPS, such as by first converting from Fibonacci state to Galois state by a sparse Fibonacci-to-Galois (F2G) matrix, performing the jump by Galois multiplying with an offset (e.g., $\alpha^n$), where alpha ($\alpha$) is the primitive root of the polynomial, and converting back to Fibonacci state by a sparse Galois-to-Fibonacci (G2F) matrix. For example, Let $x_1(n)$ be the LFSR state in Fibonacci domain at index n. $x_1(n+N)$ is the LFSR state to use at index n+N. Let $G_1(n)$ be the equivalent Galois State for the LFSR at index n. $G_1(n+N)$ can be the Galois LFSR state at index n+N.

$$G_1(n)=G2F_{x_1}*(x_1(n))$$

$$x_1(n+N)=F2G_{x_1}*G_1(n+N)$$

$$G_1(n+N)=(G_1(n)*\alpha_1^n)$$

where $\alpha_1$ is primitive root of $x_1$ in $GF(2^{31})$. Similarly, $$G_2(n)=G2F_{x_2}*(x_2(n))$$

$$x_2(n+N)=F2G_{x_2}*G_2(n+N)$$

$$G_2(n+N)=(G_2(n)*\alpha_2^n)$$

where $\alpha_2$ is primitive root of $x_2$ in $GF(2^{31})$. In this regard, cycles can be saved because $F2G_{x_1}$, $F2G_{x_2}$, $G2F_{x_1}$, and $G2F_{x_2}$ are sparse matrices. The * denotes a polynomial multiply in GF(2). In accordance with additional aspects, described herein are efficient functions for implementing $F2G_{x_1}$, $F2G_{x_2}$, $G2F_{x_1}$, and $G2F_{x_2}$.

F2G and G2F can have specific properties, such as being Toeplitz and being upper triangular with all 1's on their diagonal. Accordingly, once the G2F matrix is computed, the G2F can be created by inversion. The G2F matrix can be realized based on the Fibonacci output being a combination of several values in the previous history added together in GF(2). By creating a history of the outputs of the Galois Generator, and knowing the two output sequences are the same, the history of the output of the Galois generator is a valid Fibonacci state. The history generator is unique for every Galois generator. Because the F2G and G2G are Toeplitz, the F2G and G2G can be in turn implemented with a polynomial multiply.

In an example, for efficient processing of channel interleaving/scrambling with timeline saving, it may be useful for the LFSR state at every column be known for uplink communications (such as data/channel quality indicator (CQI) and/or rank indicator (RI)/hybrid automatic repeat/request (HARQ) acknowledgement (ACK), etc.) without having to run the LFSR in a contiguous fashion. The state of the LFSR with a given jump can be computed with Galois state advancement known from Galois multiplications. Additionally, Galois multiplication with a large and arbitrary power of the primitive polynomial can take large number of clock cycles on a processor, which can be challenging in a limited timeline environment, such as in the context of an uplink channel interleaver on a wireless device (e.g., in LTE, 5G, 6G, etc.). The effect may be dependent on the processing and/or memory resources of the wireless device (e.g., a UE, a certain type of UE, such as IoT or reduced capability UE, etc.). The order, N, of the jump and the timeline needed to accomplish the same may also depend on timeline considerations, such as the wireless communication technology (e.g., LTE, 5G, etc.) specification revision depending on slot/subframe/transmission time interval (TTI) duration, etc., and/or the control information (e.g., uplink control information (UCI), such as RI, ACK, etc.) being packed.

Described herein are efficient mechanisms to accomplish the arbitrary Galois jumps and an application of the mechanisms in cellular modems (e.g., in channel interleaving/ scrambling or deinterleaving/descrambling for a signal by a modem in a user equipment (UE) or network node). In some examples, a base representation for an advance offset of a shift register sequence can be selected, and the shift register sequence can be generated based on the advanced offset and the base representation. Signals can be processed based on the shift register sequence, which can include scrambling the signal for transmission based on the shift register sequence, descrambling a received signal based on the shift register sequence, etc. Using an arbitrary jump or base representation for the advance offset to achieve the arbitrary jump in this regard can save processing power consumption, clock cycles, MIPS, etc., and/or can save memory used to store a corresponding lookup table (LUT), etc. In some examples, the number of Galois Field multiplications required can be determined and/or a base representation can be selected and/or a shift register sequence can be generated for a certain device based on device type, processor or memory capacity of the device or corresponding application, etc.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for generating a shift register sequence for processing a signal, in accordance with aspects described herein. In addition, some nodes may have a modem 440 and BS communicating component 442 for generating a shift register sequence for processing a signal, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat Ml) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can generate a shift register sequence corresponding to an advanced offset and/or based on a base representation, and can use the shift register sequence to process a signal (e.g., to scramble an uplink signal, such as a PUSCH or reference signal, descramble a downlink signal, such as a physical downlink shared channel (PDSCH) or reference signal, etc.). In another example, BS communicating component 442 can similarly generate a shift register sequence corresponding to an advanced offset and/or based on a base representation, and can use the shift register sequence to process a signal (e.g., to scramble a downlink signal, descramble an uplink signal, etc.).

Figure 2:
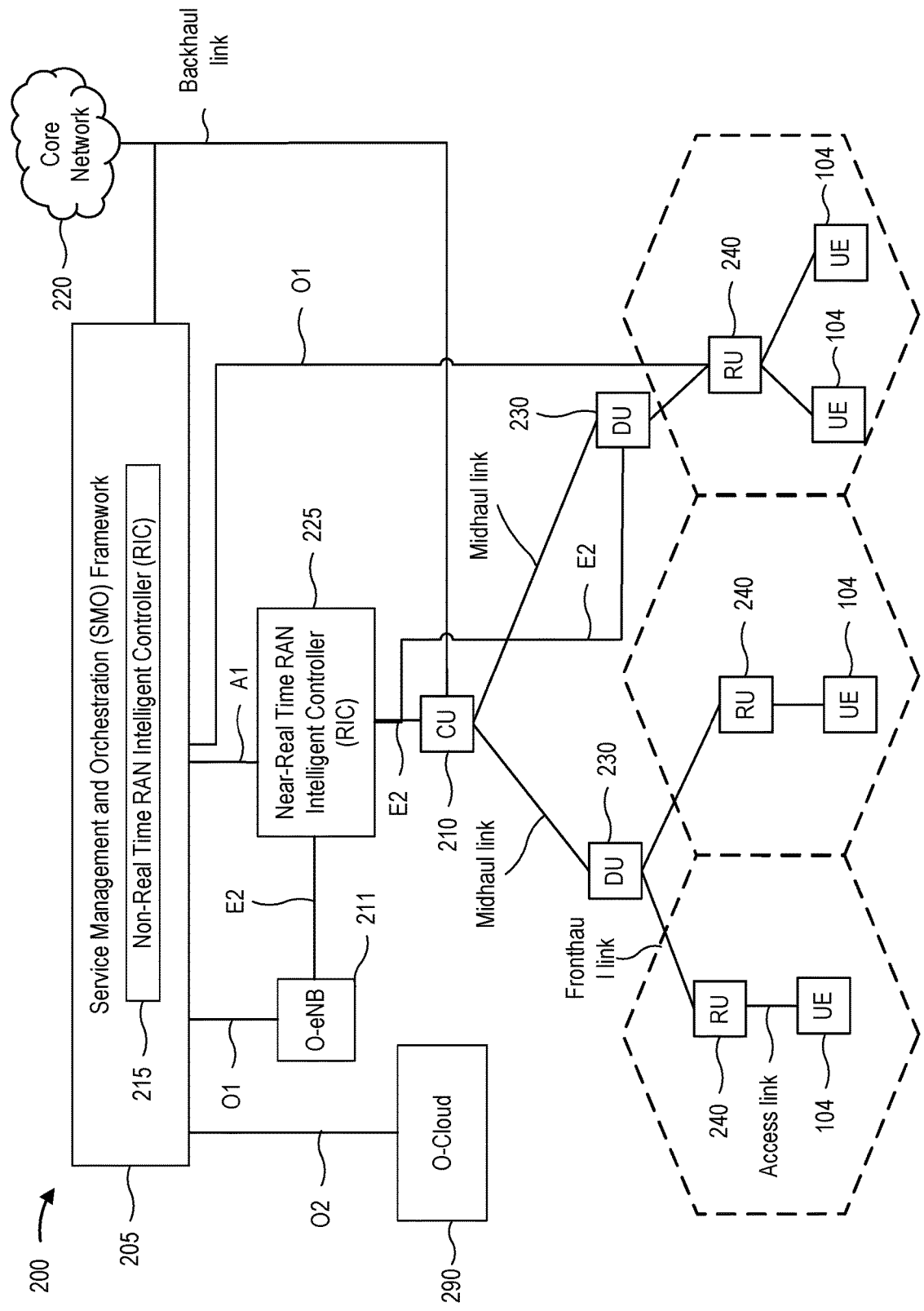
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective mid-haul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium.

Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
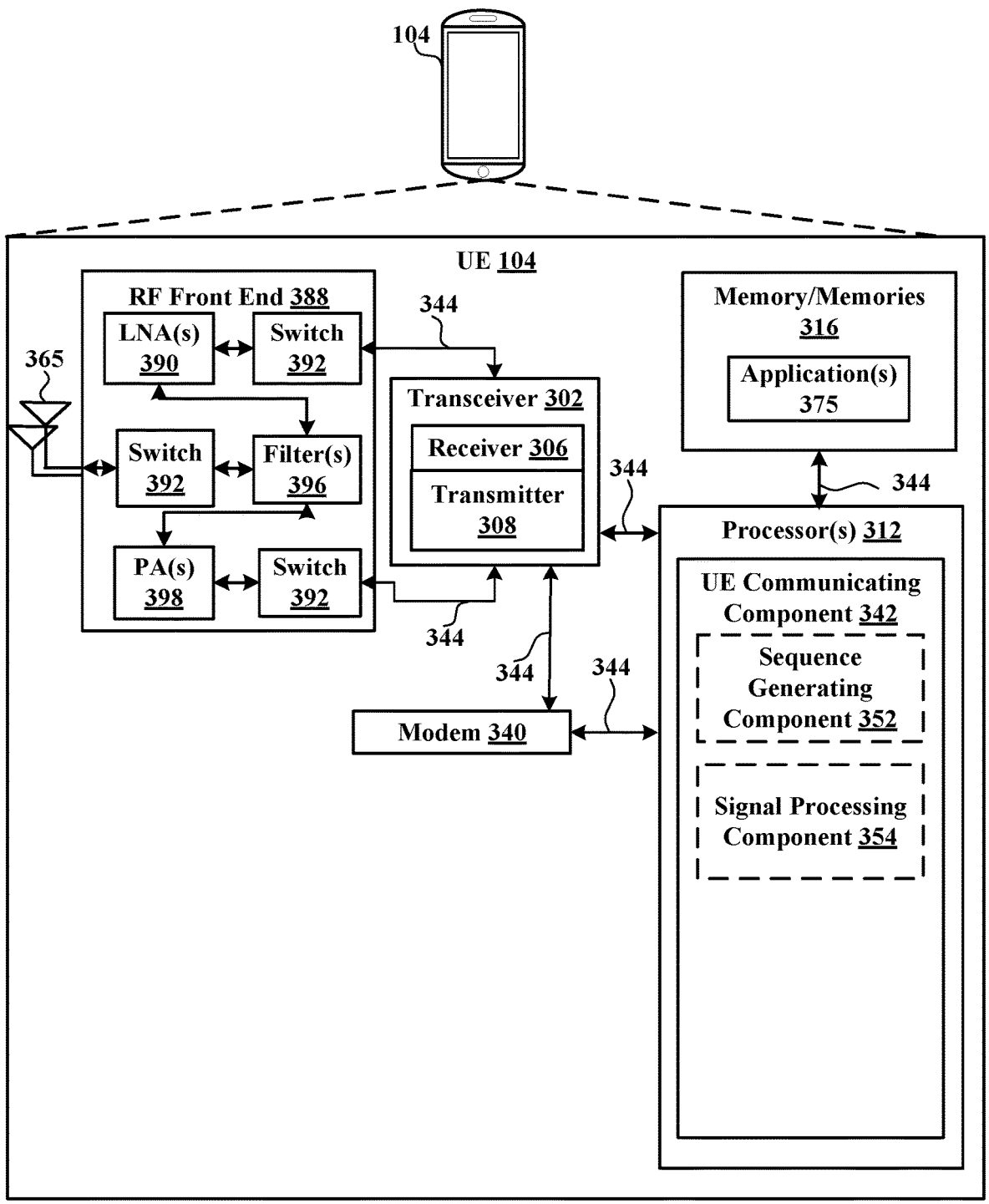
FIG. 3 is a block diagram illustrating an example of a user equipment (UE), in accordance with various aspects of the present disclosure.
Figure 4:
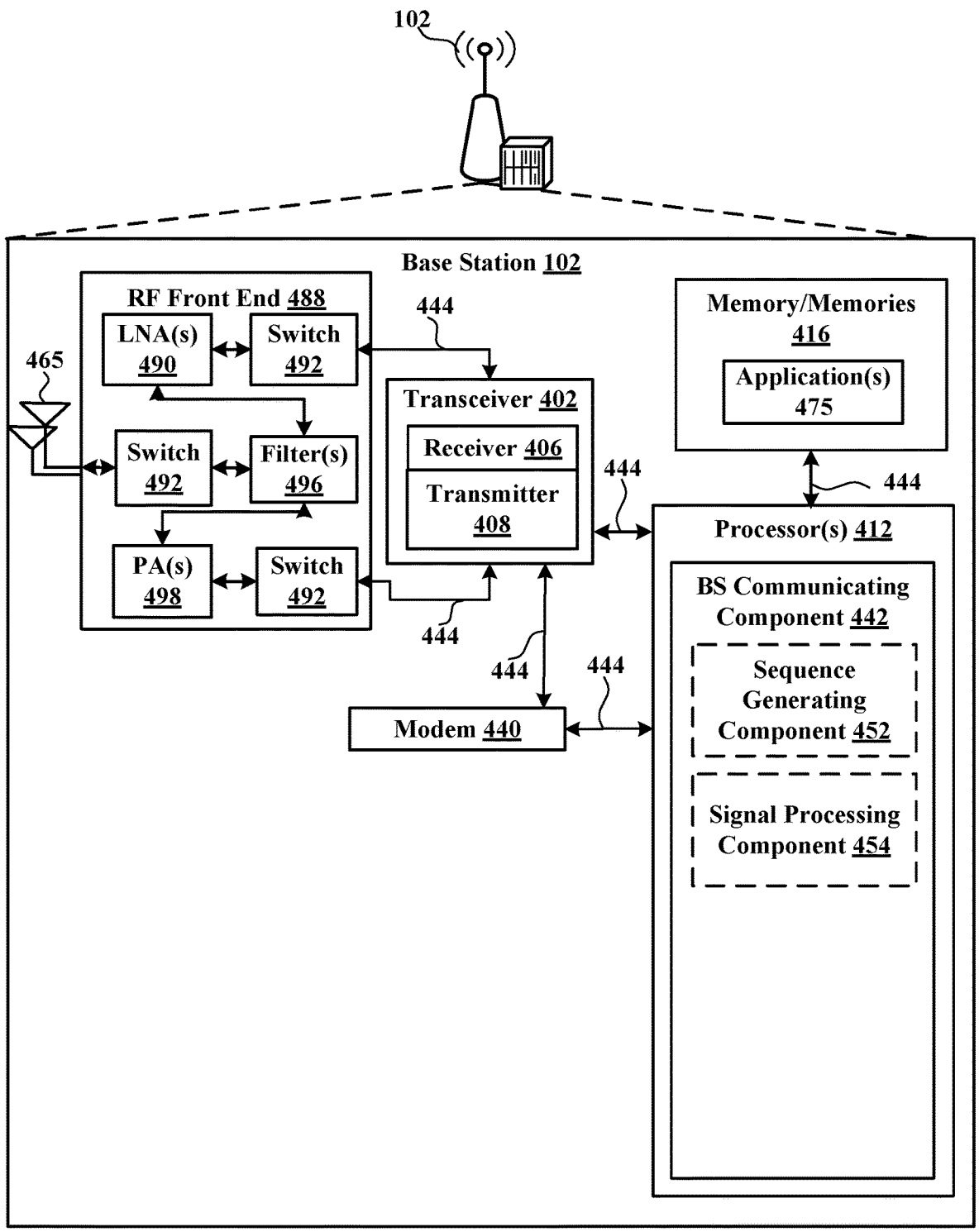
FIG. 4 is a block diagram illustrating an example of a base station, in accordance with various aspects of the present disclosure.
Figure 5:
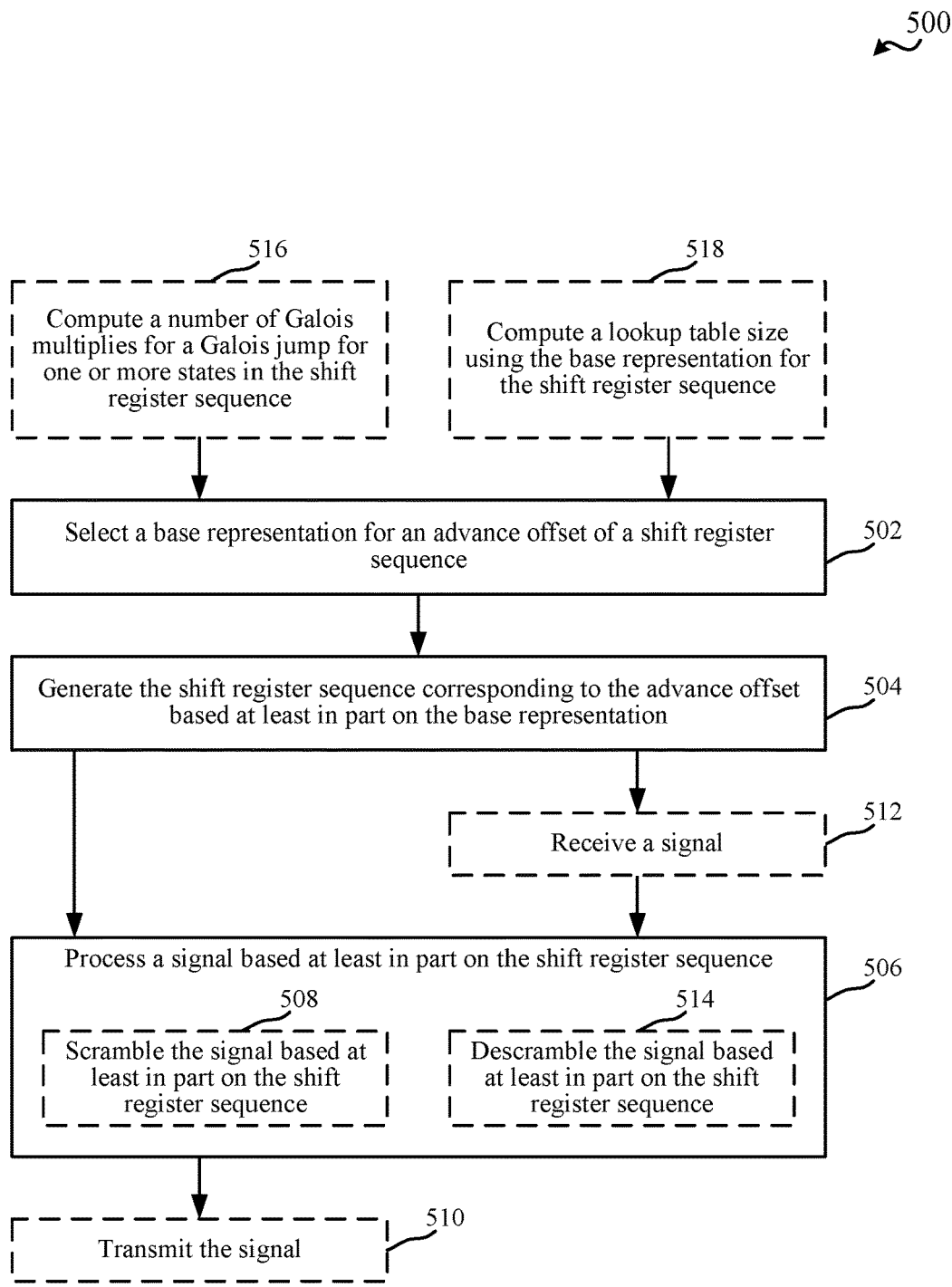
FIG. 5 is a flow chart illustrating an example of a method for generating a shift register sequence for processing a signal, in accordance with aspects described herein.
Figure 6:
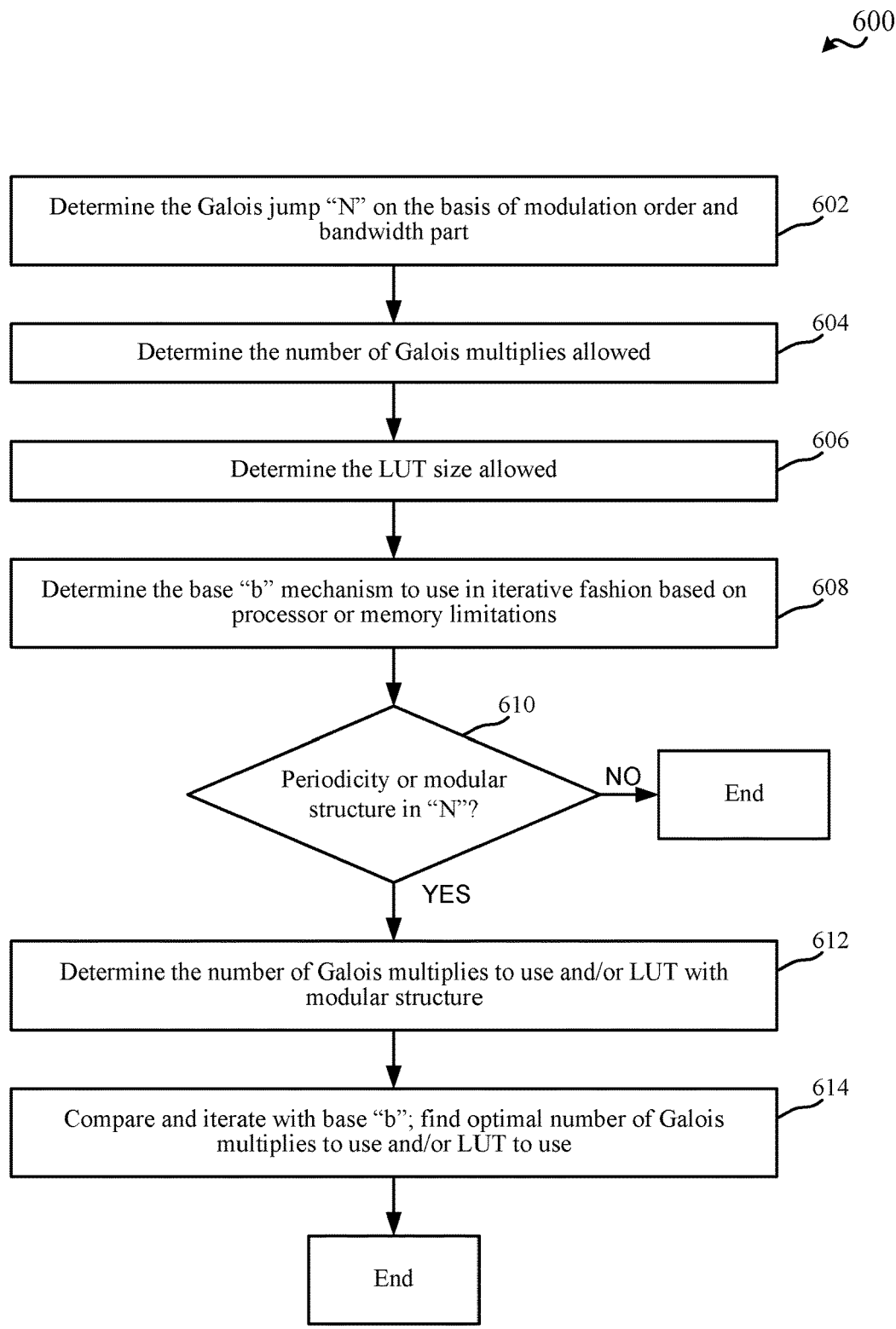
FIG. 6 is a flow chart illustrating an example of a method for selecting the base representation of the advance offset, in accordance with aspects described herein.

Turning now to FIGS. 3-7, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for generating a shift register sequence for processing a signal, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor(s) 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a sequence generating component 352 for generating a shift register sequence based on an advance offset and/or a base representation, and/or a signal processing component 354 for processing a signal using the shift register sequence.

In an aspect, the processor(s) 312 may correspond to one or more of the processors described in connection with the UE in FIG. 7. Similarly, the memory/memories 316 may correspond to the memory/memories described in connection with the UE in FIG. 7.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and/or BS communicating component 442 for generating a shift register sequence for processing a signal, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a sequence generating component 452 for generating a shift register sequence based on an advance offset and/or a base representation, and/or a signal processing component 454 for processing a signal using the shift register sequence.

In an aspect, the processor(s) 412 may correspond to one or more of the processors described in connection with the base station in FIG. 7. Similarly, the memory/memories 416 may correspond to the memory/memories described in connection with the base station in FIG. 7.

FIG. 5 illustrates a flow chart of an example of a method 500 for generating a shift register sequence for processing a signal, in accordance with aspects described herein. In an example, a UE 104 or a network node (e.g., a base station 102 or gNB 180, a monolithic base station or gNB, a portion of a disaggregated base station or gNB, a gNB that controls multiple TRPs, a gNB that provides a single TRP, a RU that is one of multiple RUs sharing a single DU, etc.), can perform the functions described in method 500 shown in FIG. 5 using one or more of the components described in FIGS. 1, 3, and/or 4.

In method 500, at Block 502, a base representation for an advance offset of a shift register sequence can be selected. In an aspect, sequence generating component 352 or 452, e.g., in conjunction with processor(s) 312 or 412, memory/memories 316 or 416, transceiver 302 or 402, UE communicating component 342 or BS communicating component 442, etc., can select the base representation for the advance offset of the shift register sequence. For example, where N is the Galois jump to be accomplished, as described above:

$$N = \text{num\_RB} * \text{num\_SC} * Q_M$$

where num_RB is the number of resource blocks of a bandwidth part (BWP) allocated for wireless communications at the UE 104 or network node, num_SC is the number of subcarriers of the BWP, and $Q_M$ is the modulation order assigned for the wireless communications. If N can be expressed in base b notation, however, then:

$$N = \sum_{k=0}^{n} \alpha_k \beta^k;$$

$$\alpha^N = \prod_{k=0}^{n} \alpha_k \beta^k$$

In this example, the number of Galois multiplies (e.g., polynomial multiply accumulate operations) per LFSR state jump, n, can be:

$$n = \text{ceil}(\log_b N)$$

and the LUT size per LFSR can be $(b-1)*\text{ceil}(\log_b N)*4$ bytes. Alternatively, if n is the number of Galois multiplies performed per LFSR jump of N, n can be obtained or determined based on a timeline restriction and/or processing/memory limitations or specifications of the UE 104 or network node as $$I * n * \frac{c}{P} < T,$$

where I is the number of shift registers to be advanced, C is processor cycles per Galois multiply, P is the processor clock, and T is the timeline limitation (e.g., imposed by the wireless communication technology, such as slot/subframe/TTI).

Where $B = \text{ceil}(\log_2 N)$, e.g., the number of bits in the jump N, the total LUT size per a single LFSR (in bytes)

$$= 4 * \text{ceil}\left(\frac{B}{n}\right) * \left(2^{\text{ceil}\left(\frac{B}{n}\right)} - 1\right)$$

bytes, assuming that each LUT entry is 4 bytes per LFSR). If X is the memory limit available in bytes per LFSR, n can be selected such that $$X \geq 4 * \text{ceil}\left(\frac{B}{n}\right) * \left(2^{\text{ceil}\left(\frac{B}{n}\right)} - 1\right).$$

In one example, sequence generating component 352 or 452 can select base $b=2^k$, where $k=\text{ceil}(\log_2 \text{ceil}(\log_n N))$.

In another example, the base representation can be a number other than a power of two. For example, in some wireless communication technologies, such as LTE, 5G, etc., 12 subcarriers can be defined per resource block (RB). The RB jumps can be multiples of 12, and modulation order $Q_M$ can be an even number. Thus, the Galois jumps, N, can be multiples of 24 (e.g., base 24) irrespective of the number of RBs (num_RB) and modulation order ($Q_M$). In this example, N=p*k+I, where p is the modularity period (e.g., 24 for the jumps). Additionally, in this example, sequence generating component 352 or 452 can select a base of 2 or another base, and can compute each state jump n based on N, as described above. In yet another example, N can be split into multiple components, such as $N_1$ and $N_2$, such that $N=N_1+N_2$. In this example, $\alpha^N = \alpha^{N_1} * \alpha^{N_2}$, where $\alpha^{N_1}$ can be derived by sequence generating component 352 or 452 selecting base b, as described above, and $\alpha^{N_2}$ can be derived using the modularity period, as described above (e.g., $N_2=p*k+I$).

In method 500, at Block 504, the shift register sequence corresponding to the advance offset based at least in part on the base representation can be generated. In an aspect, sequence generating component 352 or 452, e.g., in conjunction with processor(s) 312 or 412, memory/memories 316 or 416, transceiver 302 or 402, UE communicating component 342 or BS communicating component 442, etc., can generate the shift register sequence corresponding to the advance offset based at least in part on the base representation. For example, with the base representation for the advance offset selected, sequence generating component 352 or 452 can determine the jump for each state of the shift register sequence, and can compute the value for each state of the LFSR.

For example, the jumps can be large, for example, up to num_RB*num_SC*$Q_M$. In one example, where num_SC=12, num_RB=up to 100 for a 20 MHz allocation, and $Q_M=8$ for QAM 256, the jump N can be up to 9600 (0<N≤9600). In an example, a Galois state for a given shift in the shift register sequence can be defined by:

$$g\_\text{state}(k+1) = \text{gmpy}(g\_\text{state}(k), \alpha^N)$$

where g_state(k) is the current (e.g., kth) Galois state of LFSR (e.g. interleaver col k beginning), g_state(k+1) is the next (e.g., kth+1) Galois state of LFSR (e.g. interleaver col k+1 beginning); α is the primitive element/polynomial of the Galois field GF($2^{31}$), gmpy is the Galois multiplication operator, and $\alpha^N$ is Nth Galois exponentiation of the primitive element, α. Sequence generating component 352 or 452 can compute each state in the LFSR using this formula, in one example. A multiplicative approach may use N, up to 9600, Galois multiplications (polynomial multiply accumulate) per scrambler per column jump. This can result in 9600*11*2=211200 Galois multiplications (polynomial multiply accumulate operations), which can use a significant amount of processing resources, and may be limited by timeline expectations for channel processing in the wireless communication technology (e.g., for LTE PUSCH on a UE, LTE PDSCH on a network node or as decoded by the UE, etc.). If the UE 104 or network node can use LUTs for exponentiation, this operation may use 9600*4*2=75 KB of memory, which can be expensive in a memory constrained embedded processor. Using a different base representation and/or modularity period, as described in the above examples, may reduce the processing and/or memory requirements for computing each state in the LFSR.

For example, if N is expressed in a base b notation:

$$N = \sum_{k=0}^{n} \alpha_k \beta^k;$$

-continued $$\alpha^N = \prod_{k=0}^{n} \alpha_k \beta^k$$

then the number of Galois multiplies per LFSR state jump can be n~$\log_b$N Galois multiplies (polynomial multiple accumulate operations), and the LUT size for two LFSRs (e.g., $X_1$ and $X_2$)=(b−1)*n*8 bytes, where n~$\log_b$N. In the above example, where N=9600, for a choice b=128, 9600=(75,0) in base 128 representation. The number of Galois multiplies per LFSR state jump=2 (per column). For 11 column jumps, this can translate to 2*11*2=44 Galois multiply operations (polynomial multiple accumulate operations) for 2 LFSRs. The LUT size for two LFSRs in this example (e.g., $X_1$ and $X_2$)=204*2*4 bytes=1.6 kilobytes (for 2 GF($2^{31}$) LFSRs). Thus, in one example, sequence generating component 352 or 452 can select a base representation of 128 for the advance offset (e.g., $\alpha^N$) of the shift register sequence, and can generate the shift register sequence corresponding to the advance offset based at least in part on the base representation, which can conserve processing cycle and/or memory utilized for the LUT, as described above.

In another example, if N is expressed in another base that is not a power of two, such as modulo 24, N=x+4800, then x=24*k+I, I=x mod 24, k=x/24. When N>4800, there can be an extra gmpy function performed. In this example, sequence generating component 352 or 452 can select a base representation of 24 for the advance offset (e.g., $\alpha^N$) of the shift register sequence, and can generate the shift register sequence corresponding to the advance offset based at least in part on the base representation.

In an example, sequence generating component 352 or 452 can perform the gmpy function (Galois Multiply function) to compute each value for each state of the LFSR, which can include a computation Y=(a*b) % g, where a, b, and g are polynomials, and % is the modulo operator. g is primitive polynomial in GF(2^31) used in Galois multiplication. The Barret reduction formula is used to compute the modulo operator %, $$x \ \% \ y = x - \left\lfloor \frac{x}{y} \right\rfloor * y,$$

wherein $$\left\lfloor \frac{x}{y} \right\rfloor$$

is an integral number. In this case $$S = (a*b)\% \ g(\text{Galois Multiply to be computed}) = a*b - \left\lfloor \frac{a*b}{g} \right\rfloor * g.$$

The operators are performed in $$GF(2) = (a*b) XOR \left( \left\lfloor \frac{a*b}{g} \right\rfloor * g \right) \quad (2)$$

where $$L = \left\lfloor \frac{a*b}{g} \right\rfloor$$

is the quotient. Integral number of g can be removed so that the upper bits can be zero.

$$\frac{2^{32}}{g} = ig$$

is the inverse of the primitive polynomial g in GF($2^{31}$). Given P=a*b=$P_h$|$P_l$, then K=($P_h$*iq+$P_h$)>>32. For example, iq can be added to 1, where iq+1=ig; then 1. ig>>32 to remove effect of $$\frac{2^{32}}{g}$$

and have integral number of upper 32 bits. S=K*g+P, adding P to K*g gives remainder in lower bits. S is the result of Galois multiply. In the example, pseudo code for the gmpy function is given in the following, which can be implemented using 3 pmpy instructions.:

```
u32 gmpy32 (u32 poly, u32 ipoly, u32 x, u32 y) {
    u32 p0, rr;
    rr=hi(pmpyw(x, y));
    p0=lo(pmpyw(x, y));
    rr^=hi(pmpyw(ipoly, rr)); //missing leading 1
    p0 ^=lo(pmpyw(rr, poly));
    return (p0);
}
``` where pmpyw is Polynomial multiplication instruction, hi gives the higher 32 bits, and lo gives the lower 32 bits. Sequence generating component 352 or 452 can execute this code or similar code to compute each state of a LFSR.

In addition, in an example, sequence generating component 352 or 452 can execute F2G and G2F functions for $X_1$ and $X_2$, as described herein, which can include using reverse bits, XOR, and operations. For example, pseudo code for F2G $X_1$ can be similar to the following:

```
uint32 f2g_x1(uint32 f_state)
{
    /*[a1 a2 ... a30 0][0 ... a1 a2 a0]*/
    uint32 rev_bits=reverse_bits(f_state);
    uint32 f2g=((rev_bits) & 0x7ffffffe)^((rev_bits>>28)
        &0x6) ^(f_state&0x1);
    return f2g;
}
```

Pseudo code for F2G $X_2$ can be similar to the following:

```
uint32 f2g_x2(uint32 f_state)
{
    /*[a1 a2 ... a30 0]^[0 ... a1 a2 0]^[0 ... 0 a1 a0]
    uint32 rev_bits=reverse_bits(f_state);
    uint32 f2g=((rev_bits) & 0x7ffffffe) ^((rev_bits>>28)
        &0x6) ^(f_state&0x3);
    return f2g;
}
```

Pseudo code for G2F $X_1$ can be similar to the following:

```
uint32 g2f_x1(uint32 g_state)
{
    /*[0 ... a0]^[a1 a2 ... a30 0]^[a29 a30 ... 0]*/
    uint32 rev_bits=reverse_bits(g_state);
```

```
        uint32  g2f=((rev_bits)&(0x7fffffe))^((rev_bits<<28)
            & 0x60000000) ^(g_state& 0x1);
        return g2f;
    }
```
Pseudo code for G2F $X_2$ can be similar to the following:
```
    uint32 g2f_x2(uint32 g_state)
    {
        /*[a29 a28 . . . a0 0]^[a1 a0 0 . . . a30]^[a . . . 0]*/
        /*[a0 . . . 0]^[0a30 . . . a1]^[0 . . . a30 a29]^[0 . . . a30]*/
        /*[0 . . . a0]^[a1 a2 . . . a30 0]^[a29 a30 . . . 0]^
            [a30 . . . 0]*/
        uint32 rev_bits=reverse_bits(g_state);
        uint32  g2f=((rev_bits)&(0x7fffffe))^((rev_bits<<28)
            & 0x600000000)^(g_state& 0x40000001);
        return g2f;
    }
```
This can lead to alternative Formulation using pmpyw:
```
    uint32 g2f_x2(uint32 g_state, uint32 g2f)
    {
        uint32_t rev_bits=reverse_bits(g_state);
        uint64_t f_state=pmpyw(rev_bits, g2f);
        uint32_t fib=(uint32_t)lsr(f_state, #30)
        return(fib);
    }
```

In an example, sequence generating component 352 or 452 can perform these functions to generate the sparse F2G and/or G2F matrices and/or to convert the LFSR states, $X_1$ and $X_2$, from the Fibonacci domain to the Galois state and/or vice versa, as described. In any case, sequence generating component 352 or 452 can store each value in the shift register sequence in a state of the LFSR for use in processing a signal, as described herein. The LFSR(s) can be stored in memory/memories 316 or 416.

In method 500, at Block 506, a signal can be processed based at least in part on the shift register sequence. In an aspect, signal processing component 354 or 454, e.g., in conjunction with processor(s) 312 or 412, memory/memories 316 or 416, transceiver 302 or 402, UE communicating component 342 or BS communicating component 442, etc., can process the signal based at least in part on the shift register sequence. For example, signal processing component 354 or 454 can include an interleaver or scrambler that can scramble or encode the signal using the LFSR, as described above. In another example, signal processing component 354 or 454 can include a deinterleaver or descrambler for descrambling or decoding the signal using the LFSR, as described above.

For example, for a UE 104 transmitting an uplink signal, processing the signal at Block 506 can optionally include, at Block 508, scrambling the signal based at least in part on the shift register sequence. In this example, signal processing component 354 can scramble the signal based at least in part on the shift register sequence, by using the values in the LSFR, as described above. For example, in LTE, 5G, or similar wireless communication technologies, signal processing component 354 can scramble the signal using channel encoding and interleaving for PUSCH, as described in 3GPP TS 36.212, section 5.2.2.8. Additionally, in this example, in method 500, optionally at Block 510, the signal can be transmitted. In an aspect, UE communicating component 342, e.g., in conjunction with processor(s) 312, memory/memories 316, transceiver 302, etc., can transmit the signal using associated time and/or frequency resources.

In another example, in method 500, optionally at Block 512, a signal can be received. In an aspect, UE communicating component 342, e.g., in conjunction with processor(s) 312, memory/memories 316, transceiver 302, etc., can receive the signal, such as a downlink signal from the network node over associated time and/or frequency resources. In this example, processing the signal at Block 506 can optionally include, at Block 514, descrambling the signal based at least in part on the shift register sequence. In this example, signal processing component 354 can descramble the received signal based at least in part on the shift register sequence, by using the values in the LSFR, as described above, and can process the descrambled signal. For example, in LTE, 5G, or similar wireless communication technologies, signal processing component 354 can descramble the signal using channel encoding and interleaving for PUSCH, as described in 3GPP TS 36.212, section 5.2.2.8. In other aspects, as described herein, a network node can similarly scramble (e.g., using signal processing component 454) and transmit downlink signals, and/or can similarly receive and descramble (e.g., using signal processing component 454) uplink signals.

In method 500, optionally at Block 516, a number of Galois multiplies for a Galois jump for one or more states in the shift register sequence can be computed. In an aspect, sequence generating component 352 or 452, e.g., in conjunction with processor(s) 312 or 412, memory/memories 316 or 416, transceiver 302 or 402, UE communicating component 342 or BS communicating component 442, etc., can compute the number of Galois multiplies for the Galois jump for one or more states in the shift register sequence. For example, sequence generating component 352 or 452 can select the base representation based on the number of Galois multiplies, as described herein. In an example, sequence generating component 352 or 452 can determine processing limitations or specifications of the UE 104, and can determine the base representation that complies with (e.g., for handling) the number of Galois multiplies within the processing limitations or specifications, as described above.

In method 500, optionally at Block 518, a LUT size using the base representation for the shift register sequence can be computed. In an aspect, sequence generating component 352 or 452, e.g., in conjunction with processor(s) 312 or 412, memory/memories 316 or 416, transceiver 302 or 402, UE communicating component 342 or BS communicating component 442, etc., can compute the LUT size using the base representation for the shift register sequence. For example, sequence generating component 352 or 452 can select the base representation based on determining whether the corresponding LUT size is within a memory limitation or specification of the UE 104.

FIG. 6 illustrates a flow chart of an example of a method 600 for selecting the base representation of the advance offset, in accordance with aspects described herein. For example, method 600 can include selecting the base representation of the advance offset as described in Block 502 of method 500 of FIG. 5 above.

In method 600, at Block 602, the Galois jump, N, can be determined on the basis of modulation order and BWP. In an aspect, sequence generating component 352 or 452, e.g., in conjunction with processor(s) 312 or 412, memory/memories 316 or 416, transceiver 302 or 402, UE communicating component 342 or BS communicating component 442, etc., can determine the Galois jump, N, on the basis of modulation order, $Q_M$, and BWP (e.g., num_RB, num_SC), as described above.

In method 600, at Block 604, the number of Galois multiplies allowed can be determined, and at Block 606, the LUT size allowed can be determined. In an aspect, sequence generating component 352 or 452, e.g., in conjunction with processor(s) 312 or 412, memory/memories 316 or 416, transceiver 302 or 402, UE communicating component 342 or BS communicating component 442, etc., can determine the number of Galois multiplies allowed, and can determine the LUT size allowed. For example, as described, the number of Galois multiplies allowed can be based on a processing limitation of the UE 104 or other device performing the signal processing, a timeline for the wireless communication technology (e.g., slot/subframe/TTI), etc., and/or the LUT size allowed can be based on a memory limitation of the UE 104 or other device performing the signal processing. In an example, a IoT or reduced capability UE may have lower processing capabilities and/or memory capacity than other devices, and the number of Galois multiplies allowed and/or LUT size allowed can be differently specified and/or determined for the devices.

In method 600, at Block 608, the base, b, mechanism to use in iterative fashion can be determined based on processor and/or memory limitations. In an aspect, sequence generating component 352 or 452, e.g., in conjunction with processor(s) 312 or 412, memory/memories 316 or 416, transceiver 302 or 402, UE communicating component 342 or BS communicating component 442, etc., can determine the base, b, mechanism to use in iterative fashion based on processor and/or memory limitations (e.g., based on the number of Galois multiplies allowed and/or LUT size allowed), as described above.

In method 600, at Block 610, it can be determined whether there is a periodicity or modular structure in N. In an aspect, sequence generating component 352 or 452, e.g., in conjunction with processor(s) 312 or 412, memory/memories 316 or 416, transceiver 302 or 402, UE communicating component 342 or BS communicating component 442, etc., can determine whether there is a periodicity or modular structure in N. If not, the method 600 can terminate.

If there is a periodicity or modular structure in N, at Block 610, in method 600, at Block 612, the number of Galois multiplies to use and/or the LUT with modular structure can be determined. In an aspect, sequence generating component 352 or 452, e.g., in conjunction with processor(s) 312 or 412, memory/memories 316 or 416, transceiver 302 or 402, UE communicating component 342 or BS communicating component 442, etc., can determine the number of Galois multiplies to use and/or the LUT with modular structure, as described above.

In method 600, at Block 614, based on comparing and iterating with base b, an optimal number of Galois multiplies to use and/or the LUT to use can be found. In an aspect, sequence generating component 352 or 452, e.g., in conjunction with processor(s) 312 or 412, memory/memories 316 or 416, transceiver 302 or 402, UE communicating component 342 or BS communicating component 442, etc., can compute and iterate with base b, and can find the optimal number of Galois multiplies to use and/or the LUT to use, as described above.

Figure 7:
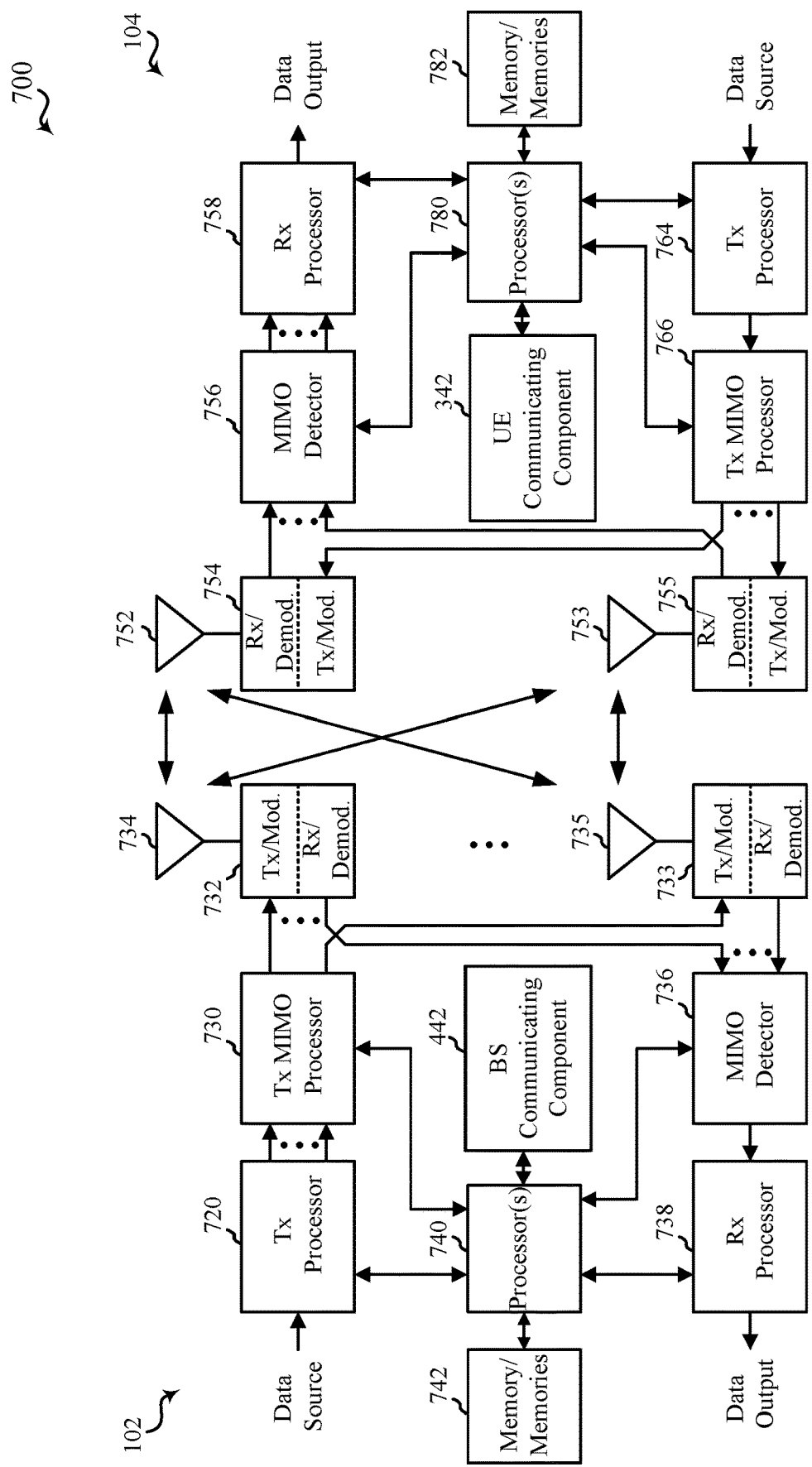
FIG. 7 is a block diagram illustrating an example of a multiple-input multiple-output (MIMO) communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 3. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to one or more processors 780, or memory/memories 782.

The one or more processors 780 may in some cases execute stored instructions to instantiate a UE communicating component 342 (see e.g., FIGS. 1 and 3).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for single carrier-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the one or more processors 740 or memory/memories 742.

The one or more processors 740 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication by a device including selecting a base representation for an advance offset of a shift register sequence, generating the shift register sequence corresponding to the advance offset based at least in part on the base representation, and processing a signal based at least in part on the shift register sequence.

In Aspect 2, the method of Aspect 1 includes where selecting the base representation is based at least in part on a processor specification of the device.

In Aspect 3, the method of Aspect 2 includes computing a number of Galois multiplies for a Galois jump for each state in the shift register sequence, where selecting the base representation is further based at least in part on the number of Galois multiplies using the base representation complying with the processor specification of the device.

In Aspect 4, the method of any of Aspects 2 or 3 includes where selecting the base representation is further based on a timeline specification of a wireless communication technology.

In Aspect 5, the method of any of Aspects 1 to 4 includes where selecting the base representation is based at least in part on a memory specification of the device.

In Aspect 6, the method of any of Aspects 1 to 5 includes computing a lookup table size using the base representation for the shift register sequence, where selecting the base representation is further based at least in part on the lookup table size complying with a memory specification of the device.

In Aspect 7, the method of any of Aspects 1 to 6 includes where the base representation is based on a modular structure.

In Aspect 8, the method of any of Aspects 1 to 7 includes where processing the signal includes scrambling the signal based at least in part on the shift register sequence.

In Aspect 9, the method of any of Aspects 1 to 8 includes where processing the signal includes descrambling the signal based at least in part on the shift register sequence.

Aspect 10 is an apparatus for wireless communication including one or more processors, one or more memories coupled with the one or more processors, and instructions stored in the one or more memories and operable, when executed by the one or more processors, to cause the apparatus to perform any of the methods of Aspects 1 to 9.

Aspect 11 is an apparatus for wireless communication including means for performing any of the methods of Aspects 1 to 9.

Aspect 12 is one or more computer-readable media including code executable by one or more processors for wireless communications, the code including code for performing any of the methods of Aspects 1 to 9.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   one or more memories configured to, individually or in combination, store instructions; and
   one or more processors communicatively coupled with the one or more memories, wherein the one or more processors are, individually or in combination, configured to execute the instructions to cause the apparatus to:
   select a base representation for expressing an advance offset value for generating a shift register sequence to achieve jumps between values of the shift register sequence;
   generate, based on the advance offset value, the shift register sequence; and
   process a signal based at least in part on the shift register sequence.

2. The apparatus of claim 1, wherein the one or more processors are, individually or in combination, configured to execute the instructions to cause the apparatus to select the base representation based at least in part on a processor specification of the apparatus.

3. The apparatus of claim 2, wherein the one or more processors are, individually or in combination, configured to execute the instructions to cause the apparatus to compute a number of Galois multiplies for a Galois jump for each state in the shift register sequence, wherein the one or more processors are, individually or in combination, configured to execute the instructions to cause the apparatus to select the base representation further based at least in part on the number of Galois multiplies using the base representation complying with the processor specification of the device.

4. The apparatus of claim 2, wherein the one or more processors are, individually or in combination, configured to execute the instructions to cause the apparatus to select the base representation further based on a timeline specification of a wireless communication technology.

5. The apparatus of claim 1, wherein the one or more processors are, individually or in combination, configured to execute the instructions to cause the apparatus to select the base representation based at least in part on a memory specification of the apparatus.

6. The apparatus of claim 1, wherein the one or more processors are, individually or in combination, configured to execute the instructions to cause the apparatus to compute a lookup table size using the base representation for the shift register sequence, wherein the one or more processors are, individually or in combination, configured to execute the instructions to cause the apparatus to select the base representation further based at least in part on the lookup table size complying with a memory specification of the apparatus.

7. The apparatus of claim 1, wherein the base representation is based on a modular structure.

8. The apparatus of claim 1, wherein the one or more processors are, individually or in combination, configured to execute the instructions to cause the apparatus to process the signal at least in part by scrambling the signal based at least in part on the shift register sequence.

9. The apparatus of claim 1, wherein the one or more processors are, individually or in combination, configured to execute the instructions to cause the apparatus to process the signal at least in part by descrambling the signal based at least in part on the shift register sequence.

10. A method for wireless communication by a device, comprising:
    selecting a base representation for expressing an advance offset value for generating a shift register sequence to achieve jumps between values of the shift register sequence;
    generating, based on the advance offset value, the shift register sequence; and
    processing a signal based at least in part on the shift register sequence.

11. The method of claim 10, wherein selecting the base representation is based at least in part on a processor specification of the device.

12. The method of claim 11, further comprising computing a number of Galois multiplies for a Galois jump for each state in the shift register sequence, wherein selecting the base representation is further based at least in part on the number of Galois multiplies using the base representation complying with the processor specification of the device.

13. The method of claim 11, wherein selecting the base representation is further based on a timeline specification of a wireless communication technology.

14. The method of claim 10, wherein selecting the base representation is based at least in part on a memory specification of the device.

15. The method of claim 10, further comprising computing a lookup table size using the base representation for the shift register sequence, wherein selecting the base representation is further based at least in part on the lookup table size complying with a memory specification of the device.

16. The method of claim 10, wherein the base representation is based on a modular structure.

17. The method of claim 10, wherein processing the signal includes scrambling the signal based at least in part on the shift register sequence.

18. The method of claim 10, wherein processing the signal includes descrambling the signal based at least in part on the shift register sequence.

19. One or more non-transitory computer-readable media including code executable by one or more processors for wireless communication by a device, the code including code for:
 selecting a base representation for expressing an advance offset value for generating a shift register sequence to achieve jumps between values of the shift register sequence;
 generating, based on the advance offset value, the shift register sequence; and
 processing a signal based at least in part on the shift register sequence.

20. The one or more non-transitory computer-readable media of claim 19, wherein selecting the base representation is based at least in part on a processor specification of the device.

\* \* \* \* \*